United States Patent [19]

Taylor

[11] 3,966,455

[45] June 29, 1976

[54] PROCESS FOR ILMENITE ORE REDUCTION

[76] Inventor: Paul Franklin Taylor, P.O. Box 468, Crossville, Tenn. 38555

[22] Filed: Mar. 28, 1974

[21] Appl. No.: 455,624

Related U.S. Application Data

[63] Continuation-in-part of Ser. No. 117,098, Feb. 19, 1974, Pat. No. 3,811,871.

[52] U.S. Cl. .................................. 75/21; 75/101 R; 75/123 M; 75/92; 75/97 R
[51] Int. Cl.² ...................... C22C 38/14; C22B 5/00
[58] Field of Search ................ 75/97 R, 101 R, 129, 75/175.5, 21, 92, 123 M

[56] References Cited

UNITED STATES PATENTS

| | | | |
|---|---|---|---|
| 1,593,660 | 7/1926 | Lubowsky | 75/27 |
| 2,366,177 | 1/1945 | Campbell | 75/92 X |
| 3,167,420 | 1/1965 | Robiette | 75/92 X |

*Primary Examiner*—Herbert T. Carter

[57] ABSTRACT

Ilmenite, one of the two natural occurring ores containing Titanium metal, is plentiful in comparison to the other, Rutile. However, Ilmenite can hardly compete with Rutile for Titanium metal production due to it's iron content, while Rutile includes only the oxides of Titanium ($TiO_2$). Consequently, vast deposits of Ilmenite are not presently utilized for Titanium metal production because of the initial costs incident to first removal of the iron oxides from such ore so as to bring it to the proper chemical configuration (Rutile-like $TiO_2$) for subsequent reductions to the metal; and thus that ore's vast deposits are not so utilized. Instant process utilizes powdered Ilmenite ore without such first removal of the iron oxides, and operates to produce a high grade Iron-Titanium alloy metal. The powdered ore is mixed with a solution containing primarily phosphoric acid, zinc oxide, and a sulfated surfactant. A carbonate of either of the Classes I-A or II-A Metals is added to the solution and the mixture is brought to a boil, allowing the volatile materials to vaporize to form dry, solid residue. The residue is then smelted to yield the alloy metal.

2 Claims, No Drawings

PROCESS FOR ILMENITE ORE REDUCTION

This application is a continuation-in-part of copending application Ser. No. 117,098, filed Feb. 19, 1971 now U.S. Pat. No. 3,811,871.

The present invention relates to a method of separating the Iron and Titanium metals from chemically combined oxygen within the Ilmenite ore; more specifically termed reduction of the oxides in which the metals exist as parts; such separating herein known as Ilmenite Ore Reduction. More specifically it is an extension of that state of the art as taught by Paul Franklin Taylor for *Class IV-B Metals Ore Reduction* in the copending application.

The copending application provides for usage of Ilmenite ore in the sense that Titanium oxides are first removed from that ore so that they may enter that process for Titanium metal production. The present invention utilizes Ilmenite ore with the same process ingredients as used in copending application, but for the production of Iron-Titanium metal alloy.

As starting materials for this process; powdered or pulverized Ilmenite metal ore is mixed with the herein described liquid chemical solution formula, and powdered or pulverized carbonates of any of the Classes I-A and II-A metals is added as catalyst. The ore is basically $FeTiO_3$ (or those having various oxygen chemical content). The liquid chemical solution formula is of composition and weight ratio as follows:

Phosphoric acid - - - 24.20 pounds plus or minus 6.00 pounds

Zinc oxide - - - 0.50 pounds plus or minus 0.25 pounds

Sulfated surfactant - - - 1.00 lbs. more or less

The sulfated surfactant is a type of wetting agent and of composition alkylphenol polyglycol ether. The powdered carbonate should be at least 99% pure.

When the selected ore and other starting materials are mixed together within a common container and heated with endothermic heat, gases (including oxygen) are volatilized from the solution, thereby creating deficiencies of that element within certain of the solution components, which creates deoxidized and dehydrated effects of those components, and by such action the evolution of the element oxygen from the ores. Also, the ore is digested by progressively stronger solution made so by the continuing deoxidized and dehydrated components being boiled so that the final residue is considered "fixed" for subsequent smelting.

It is, therefore, an object of the present invention to provide a method for the reduction of Ilmenite ore to Iron-Titanium alloy.

It is, also, an object of the present invention to provide a method whereby vast deposits of Ilmenite ore may be well utilized.

Other objects and advantages of the present invention will become apparent from a further reading of the description and the appended claims.

With the above and other objects in view the present invention mainly comprises a process for separating the Iron and Titanium metals within the Ilmenite ore from chemically combined oxygen; featuring ease of reduction operations, production of high grade alloy metal, and one that utilizes extensive deposits of Ilmenite ore which would otherwise remain unusable with respect to initial cost of removal of Iron content for Titanium metal production.

The process begins with the stated mixing together of the starting materials within a suitable pot or vat, followed by stirring or agitating until the visible chemical reaction is completed, and the mixture is homogeneous and blended.

The pot or vat then operates within proximity of a suitable furnace arrangement where effective heat may be applied to it.

The solution with the ore and catalyst is then boiled with heat until sufficient liquid and certain other elements have volatilized and escaped from the pot or vat as flue gases. The boiling is attended and enhanced by frequent stirrings with a suitable agitator. It is also attended by such mechanical arrangements as necessary for collecting and venting of the flue gases.

The temperature operation range throughout the boiling period is that which is necessary for maintaining a gentle rolling boil. Heating is terminated when residue is baked to a dry and solid state.

The reduced ore may then be smelted and refined to alloy form by conventional furnace mechanisms and techniques (which are not a part of this application for ore reduction), suitable for production of Iron-Titanium alloy metal utilizing the resultant product from the instant reduction process.

OPERATIONAL EXAMPLE—FOR ILMENITE ORE REDUCTION

The operation for Iron-Titanium alloy metal production as derived from the foregoing specification may be exemplified more particularly by an explanation for the reduction of a 20 pound batch of Ilmenite ore ($FeTiO_3$), which the inventor has operated successfully. Examples of other batch volumes will not herein be given for Ilmenite ore because inventor has reduced various batch volumes and finds the ratios of all materials used remain relatively constant in proportion to given example.

The reduction equipment consists of the same as that used in the previous copending application (*Class IV-B Metals Ore Reduction*, Ser. No. 117,098, filed Feb. 19, 1971).

Introduced within the pot are 13 pounds (approximately 1 U.S. gallon) liquid chemical solution called Taylor formula; such solution being comprised of ingredients as described in the above specification. In addition to it's wetting qualities this formula also has the properties for forming passivated coatings on metallic surfaces, and thereby preventing further oxidation, and may (as is applied in this process) accomplish reduction of the metallic ores provided the solution is deoxidized and dehydrated—which it is here caused to be by the boiling and consequent volatilizing of the elements oxygen and water.

To the solution is added 20 pounds (approximately 1 U.S. gallon) of Ilmenite ore ($FeTiO_3$), ground to approximately −325 mesh.

Good stirring of the mixture at this time permits saturation by the solution of all the ore particles within the batch.

The ratio by weight for this batch (and all other various and possible batches) is approximately 13 pounds Taylor formula solution to approximately 20 pounds of ore (or approximately 1 U.S. gallon of formula to 1 U.S. gallon of −325 mesh Ilmenite ore).

To this mixture is added approximately one-half pound (approximately 1 cup) of limestone of about −100 mesh grade. This type is at least 99% pure calcium carbonate ($CaCO_3$).

The mixture is again stirred vigorously to aid limestone in entering the solution completely, with the chemical reaction result being the release of carbon dioxide ($CO_2$) gas. The resulting lime (CaO) enters the solution as a catalytic agent supporting reduction of the ore when the solution begins to be deoxidized and dehydrated by volatilizing (boiling).

When mixing of ingredients is completed and the reaction has ceased, with pot resting within the furnace, heat is applied from the burner below (which is gas fired) until boiling is attained.

As the mixture begins to boil the burner is adjusted so that a gentle rolling boil is maintained and the fume-removing hood-cover is positioned over the pot. Throughout the entire boiling operation hood-cover is kept closed as much as possible to allow least amount of fume discomfort to the operator.

The boiling continues for approximately one-half hour until residue is dry and solid after which the burner is shut off and the pot removed from the furnace.

The residue is removed from the pot and transported through a crushing and grinding operation sufficient for entry into the smelting and refining furnace (which is not a part of this application for ore reduction).

ILMENITE ORE REDUCTION CHEMISTRY

The discussion of the chemistry involved in the above specification and example compares to that given in the copending application for *Class IV-B Metals Ore Reduction*, Ser. No. 117,098, filed Feb. 19, 1971, and needs not be repeated herein or added to except to say; that when Taylor formula solution deviates from the ideal stoichiometric amounts of ingredients as given to the plus and minus values solution is weaker but still operational and effective for the reductions of the ore between the high and low limit values; also that with usage of the various carbonates other than calcium carbonate (of the Class I-A and II-A Metal series) stronger or weaker reactions (catalytically) transpire, but are, nonetheless, still operational and effective for the reductions of the ore between the various types—all release $CO_2$ gas upon entry into the solution (or mixture) and the oxide remains in suspension as the catalyst agent, the limestone being synonymous (upon expelling $CO_2$ gas while retaining in solution mixture the CaO) with the other carbonates usable. When solutions used are thus weaker by virtue of varying amounts of solution ingredients and various carbonates utilized it may be compensated for by using greater amounts of solution and boiling longer.

What is claimed as new and desired to be secured by Letters Patent is:

1. A method of reducing ilmenite metal ore oxides comprising the steps of: (a) Admixing finely divided ilmenite ore with a liquid chemical solution consisting essentially of about 24.2 parts by weight of phosphoric acid, about 0.5 parts by weight of zinc oxide, and about 1.0 part by weight of a sulfated surfactant, (b) admixing and dissolving about one-half pound finely divided limestone (calcium carbonate, $CaCO_3$) or the carbonate of a Class IA or IIA metal per approximately 20 pounds of concentrated ilmenite ore, (c) stirring to aid chemical reaction and maintain mixture homogeneity, (d) heating the mixture to vaporize volatile materials and until residue is baked to a dry and solid state, and (e) smelting the remaining solid material to produce iron - titanium alloy metal.

2. The process of claim 1 wherein sulfated surfactant is an alkylphenol polyglycol ether.

* * * * *